United States Patent [19]

Plattner et al.

[11] Patent Number: 4,770,818

[45] Date of Patent: Sep. 13, 1988

[54] PROCESS FOR THE PREPARATION OF 1-AMINOANTHRAQUINONES

[75] Inventors: Eric Plattner, Seltisberg; Gottfried Seifert, Magden; Tibor Somlo, Birsfelden, all of Switzerland

[73] Assignee: Ciba-Geigy Corporation, Ardsley, N.Y.

[21] Appl. No.: 110,162

[22] Filed: Oct. 19, 1987

[30] Foreign Application Priority Data

Oct. 28, 1986 [CH] Switzerland ..................... 4267/86

[51] Int. Cl.$^4$ .............................................. C07C 97/24
[52] U.S. Cl. ..................................... 260/378; 260/381
[58] Field of Search ...................... 260/378, 369, 381

[56] References Cited

U.S. PATENT DOCUMENTS 3,966,775  6/1976  Fukui et al. ........................ 260/378
3,994,932  11/1976  Iwamura et al. ..................... 260/378
4,549,989  10/1985  Schmutz et al. .................... 260/381

OTHER PUBLICATIONS

*U.S. equivalent to German 2,450,883 cited in p. 1 of this specification.

Primary Examiner—Glennon H. Hollrah
Assistant Examiner—Raymond K. Covington
Attorney, Agent, or Firm—Kevin T. Mansfield; Edward McC. Roberts

[57] ABSTRACT

There is disclosed a process for the preparation of 1-aminoanthraquinones from 5-nitro-1,4,4a,9a-tetrahydroanthraquinones with a basic reducing agent, which process is carried out under pressure in the temperature range above 100° C. and in an aqueous-organic medium. The process affords very pure 1-aminoanthraquinone, which is, inter alia, an important intermediate.

4 Claims, No Drawings

PROCESS FOR THE PREPARATION OF 1-AMINOANTHRAQUINONES

The present invention relates to a process for the preparation of 1-aminoanthraquinones from 5-nitro-1,4,4a,9a-tetrahydroanthraquinones.

1-Aminoanthraquinones are important intermediates for the synthesis of dyes, and the preparation of very pure 1-aminoanthraquinones is contemplated with the aim of economic further processing.

A process for the preparation of 1-substituted anthraquinones is disclosed in German Offenlegungsschrift No. 2 450 883, which process also starts from 5-nitro-1,4,4a,9a-tetrahydroanthraquinone, which is reacted at 0° to 200° C., in liquid medium, with a basic reducing agent or a combination of a reducing agent and a base. In this process, however, it is only possible to obtain products that do not have the desired purity.

It is the object of the present invention to provide a process which makes it possible to prepare 1-aminoanthraquinones in greater purity. This object is achieved by carrying out the process under pressure within a specific temperature range.

Accordingly, the present invention relates to a process for the preparation of 1-aminoanthraquinones of formula

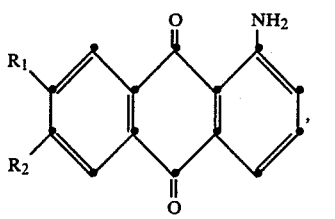
(I)

wherein $R_1$ and $R_2$ are each independently of the other a hydrogen atom, $C_1$–$C_4$alkyl or halogen, by reacting a 5-nitro-1,4,4a,9a-tetrahydroanthraquinone of formula

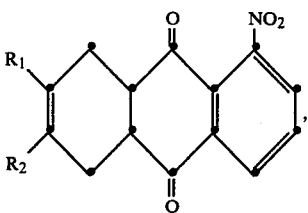
(II)

with a basic reducing agent, in the temperature range from 110° to 180° C., in an aqueous-organic medium, which process comprises carrying out the reaction under pressure, which pressure is above the saturation vapor pressure of the aqueous-organic medium at the chosen temperature.

The starting 5-nitro-1,4,4a,9a-tetrahydroanthraquinone of formula II is known and can be prepared e.g. by Diels-Alder reaction of butadiene with 5-nitro-1,4-naphthoquinone. 5-Nitro-1,4-naphthoquinone can in turn be obtained e.g. by electrolytic oxidation of 1-nitronaphthalene or by nitration of 1,4-naphthoquinone.

Examples of starting materials of formula II are: 5-nitro-1,4,4a,9a-tetrahydroanthraquinone, 2- or 3-methyl-5-nitro-1,4,4a,9a-tetrahydroanthraquinone, 2- or 3-chloro-5-nitro-1,4,4a,9a-tetrahydroanthraquinone and 2,3-dimethyl-5-nitro-1,4,4a,9a-tetrahydroanthraquinone. Among these compounds, the preferred starting material for the preparation of the important dyestuff intermediate, 1-aminoanthraquinone, is 5-nitro-1,4,4a,9a-tetrahydroanthraquinone.

As basic reducing agents it is possible to use all compounds which are able to reduce the 5-nitro compound of formula II to the 1-amino compound of formula I in an aqueous-organic medium under pressure. Examples of such reducing agents are, in particular, bisulfides such as lithium bisulfide, sodium bisulfide, potassium bisulfide, rubidium bisulfide and ammonium bisulfide; sulfides such as lithium sulfide, sodium sulfide, potassium sulfide, cesium sulfide and ammonium sulfide; disulfides and polysulfides such as sodium disulfide, sodium polysulfide, potassium disulfide, potassium polysulfide, ammonium disulfide and ammonium polysulfide.

The basic reducing agent is added in an amount of at least 0.4 mole, preferably 0.4 to 2.0 moles and, most preferably, 0.5 mole per mole of 5-nitro compound of formula II.

The reaction is carried out in an aqueous-organic medium, the organic component of which is a water-immiscible organic solvent in which the products are sufficiently soluble. Examples of such solvents are: aromatic compounds such as benzene and, preferably, alkylated and halogenated benzenes such as toluene, xylene, monochlorobenzene, dichlorobenzene, and also methyl isobutyl ketone, as well as n-butanol, 2-butanol and isobutanol, and mixtures thereof. It is preferred to carry out the reaction in a mixture of water and toluene as reaction medium.

The reaction temperature is in the range from 110° to 180° C. and, preferably, from 155° to 165° C. The reaction time when carrying out the process discontinuously is from about 10 to 30 minutes, whereas the reaction time for the continuous procedure is from about 2 to 5 minutes.

The process of this invention is carried out under pressure, which pressure must always be above the saturation vapor pressure of the aqueous-organic medium at the chosen reaction temperature. The pressure will normally be in the range from 0.5 to 20 bar, i.e. the process is carried out normally under 0.5 to 2.0 bar above the saturation vapor pressure.

Carrying out the process of the invention under pressure affords a number of essential advantages compared with the procedure which is carried out under normal pressure. For example, a very good separation of organic and aqueous phase is achieved, the organic phase containing essentially the total amount of products without by-products. These by-products remain in solution in the aqueous phase, which is separated under pressure. This feature is the basis for markedly enhanced crystallisation conditions for 1-aminoanthraquinones. The 1-aminoanthraquinones are obtained in well crystallised form in 99% purity (virtually without impurities), and the yield is higher than 98%. 1-Aminoanthraquinones of this quality can be used direct, i.e. without purifying operations, for dye synthesis.

The good phase separation also permits the process of this invention to be carried out as a continuous process.

In addition, the process can be carried out at a higher reaction temperature, whereby hydroxylamines, which are formed as intermediates, are converted almost completely into the corresponding amino compounds. The higher reaction temperature and the greater solubility of the products in the organic phase associated there-with also results in reducing the amount of organic phase—a feature of great importance for an industrial process.

The process of this invention is carried out, for example, such that a suspension of the 5-nitro compound of formula II in toluene is prepared and added to an aqueous solution of sodium bisulfide. The phase mixture is then transferred to an autoclave. The autoclave is closed and the contents heated for 20 minutes. The aqueous phase is then separated under pressure, the organic phase is cooled, and the 1-amino compound of formula I is isolated therefrom by filtration.

The invention is illustrated by the following Examples in which parts are by weight.

EXAMPLE 1

A 2 liter autoclave equipped with anchor stirrer is charged with 64.3 parts of 5-nitro-1,4,4a,9a-tetrahydroanthraquinone, 750 parts of toluene, 250 parts of water and 8.8 parts of sodium bisulfide. With stirring, the phase mixture is heated to 160° C. under an excess pressure of 10 to 11 bar. Stirring is then discontinued and the lower layer is separated under this pressure. The upper phase is cooled to room temperature, whereupon the pure 1-aminoanthraquinone crystallises and is then isolated by filtration, washed with 75 parts of toluene and vaccum dried at 80° C. In the further batches, the bulk (e.g. ⅔) of the toluene-containing mother liquor is used instead of fresh toluene. In this manner 55 parts of 1-aminoanthraquinone in 99% purity are obtained, corresponding to a yield of about 99% of theory.

EXAMPLE 2

The 2 liter autoclave is charged with 64.3 parts of 5-nitro-1,4,4a,9a-tetrahydroanthraquinone and 750 parts of toluene. The mixture is heated to 160° C. in the closed system and, at this temperature, 8.8 parts of NaHS in 250 parts of water are added over 5 minutes. The pressure is 10 bar. Working up is effected as described in Example 1. The product is obtained in the same yield and purity as in Example 1.

EXAMPLE 3

(Continuous process)

A solution of 100 parts of 5-nitro-1,4,4a,9a-tetrahydroanthraquinone in 400 parts of toluene, 1000 parts of toluene-containing mother liquor and a solution of 8.8 parts of sodium bisulfide in 400 parts of water are charged simultaneously to a tube reactor (volume: 100 ml) with static mixing elements. The average residence time is c. 3 minutes. The feed temperature of the components is regulated such that the reaction mixture leaves the reactor at 160° C. and is separated continuously in a separating vessel under pressure (10 bar) into an aqueous and an organic phase. The pressure is relaxed in the working up reactor containing the organic phase, which is cooled to room temperature. The product is isolated by filtration, washed with toluene and dried under vacuum at 80° C. The aqueous phase is extracted with the mother liquor, a portion of which is recycled to the reactor. In stationary operation, 86 parts of 1-aminoanthraquinone are obtained per hour in 99% purity (layer chromatography), corresponding to a yield of 98% of theory, based on 5-nitrotetrahydroanthraquinone.

EXAMPLE 4

The process of Example 1 is repeated, replacing 64.3 parts of 5-nitro-1,4,4a,9a-tetrahydroanthraquinone by 71.3 parts of 5-nitro-2,3-dimethyl-1,4,4a,9a-tetrahydroanthraquinone (obtained from 1-nitronaphthoquinone and 2,3-dimethyl-1,4-butadiene by Diels-Alder reaction), to give 61.9 parts of 1-amino-6,7-dimethylanthraquinone in 99% purity, corresponding to a yield of 99% of theory.

What is claimed is:

1. A process for the preparation of a 1-aminoanthraquinone of formula

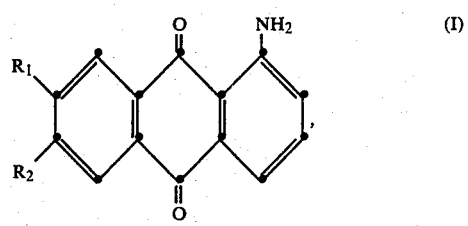

wherein $R_1$ and $R_2$ are each independently of the other a hydrogen atom, $C_1$-$C_4$alkyl or halogen, by reacting a 5-nitro-1,4,4a,9a-tetrahydroanthraquinone of formula

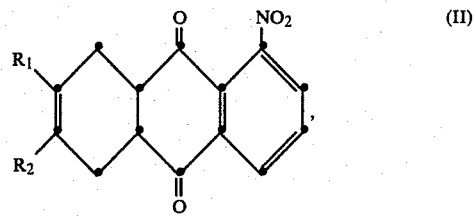

with a basic sulfide reducing agent, in the temperature range from 110° to 180° C., in an aqueous-organic medium, which process comprises carrying out the reaction under pressure, which pressure is above the saturation vapor pressure of the aqueous-organic medium at the chosen temperature.

2. A process according to claim 1, wherein the reaction is carried out in the temperature range from 155° to 165° C.

3. A process according to claim 1, wherein the organic component of the aqueous-organic medium is a water-immiscible solvent.

4. A process according to claim 3, wherein the reaction is carried out in a mixture of water and toluene.

* * * * *